United States Patent
Frank et al.

(10) Patent No.: US 12,243,421 B2
(45) Date of Patent: Mar. 4, 2025

(54) METHOD AND ARRANGEMENT FOR PREDICTING SWITCHING TIMES OF A SIGNAL GROUP OF A SIGNAL INSTALLATION FOR CONTROLLING A FLOW OF TRAFFIC

(71) Applicant: Yunex GmbH, Munich (DE)

(72) Inventors: Harald Frank, Höhenkirchen-Siegertsbrunn (DE); Michel Tokic, Tettnang (DE); Marc Christian Weber, Munich (DE)

(73) Assignee: Yunex GmbH, Munich (DE)

( * ) Notice: Subject to any disclaimer, the term of this patent is extended or adjusted under 35 U.S.C. 154(b) by 306 days.

(21) Appl. No.: 17/781,642

(22) PCT Filed: Nov. 10, 2020

(86) PCT No.: PCT/EP2020/081561
§ 371 (c)(1),
(2) Date: Jun. 1, 2022

(87) PCT Pub. No.: WO2021/110370
PCT Pub. Date: Jun. 10, 2021

(65) Prior Publication Data
US 2022/0415170 A1    Dec. 29, 2022

(30) Foreign Application Priority Data
Dec. 4, 2019 (DE) .............. 10 2019 218 903.2

(51) Int. Cl.
*G08G 1/081* (2006.01)
*G06N 3/045* (2023.01)
(52) U.S. Cl.
CPC .......... *G08G 1/081* (2013.01); *G06N 3/045* (2023.01)

(58) Field of Classification Search
CPC .............................. G08G 1/081; G06N 3/045
See application file for complete search history.

(56) References Cited

U.S. PATENT DOCUMENTS

| | | |
|---|---|---|
| 2003/0065633 A1 | 4/2003 | Neuneier et al. |
| 2008/0235398 A1 | 9/2008 | Helbing et al. |
| 2016/0379126 A1 | 12/2016 | Ozatay et al. |

FOREIGN PATENT DOCUMENTS

| | | |
|---|---|---|
| DE | 102005023742 A1 | 11/2006 |
| DE | 102017213350 A1 * | 2/2019 |

(Continued)

OTHER PUBLICATIONS

Zimmermann H. G., Neuneier R., Grothmann R.: Modeling of Dynamical Systems by Error Correction Neural Networks, in: Modeling and Forecasting Financial Data, Techniques of Nonlinear Dynamics, Eds. Soofi, A. and Cao, L., Kluwer Academic Publishers, 2002, pp. 237-263.

(Continued)

*Primary Examiner* — Peter D Nolan
*Assistant Examiner* — Roy Rhee
(74) *Attorney, Agent, or Firm* — Schmeiser, Olsen & Watts, LLP

(57) ABSTRACT

Real state information, which influences the switching times of a light signal system, is supplied as input signals to a first neural network in a fixed time cycle. The first neural network calculates estimated state information as a replacement for real state information or parts of the real state information which are not received in good time or are received incorrectly in the fixed time cycle. This estimated state information is output to artificial intelligence which predicts the switching times. The first neural network allows the artificial intelligence to also make good predictions for the switching times of signal groups when one of the many communication paths involved fails or is overloaded. It is therefore (Continued)

possible to predict signal group states in the fixed time cycle in real time with a high degree of robustness and tolerance with respect to gaps in the time cycle of the real state information provided.

13 Claims, 6 Drawing Sheets

(56) References Cited

FOREIGN PATENT DOCUMENTS

| DE | 102018221044 | 6/2020 |
|----|--------------|--------|
| EP | 1252566 B1 | 9/2003 |
| EP | 3564922 A1 | 11/2019 |

OTHER PUBLICATIONS

PCT International Search Report and Written Opinion of International Searching Authority mailed Feb. 24, 2021 corresponding to PCT International Application No. PCT/EP2020/081561 filed Oct. 11, 2020.

S. Haykin, Neural Networks: A Comprehensive Foundation, Prentice Hall, Second Edition, ISBN 0-13-273350-1, pp. 732-789, 1999.

Yang, Zhang et al: "Missing traffic flow data prediction using least squares support vector machines in urban arterial streets"; Computational Intelligence and Data Mining; 2009. CIDM '09. IEEE Symposium On; IEEE; Piscataway; NJ; USA; Mar. 30, 2009; pp. 76-83; XP031456519; ISBN: 978-1-4244-2765-9.

"Sitraffic ESCoS, Das kooperative Verkehrssystem für die digitale Straße", erhältlich im Internet am Sep. 24, 2019 un-ter https://assets.new.siemens.com/siemens/assets/api/uuid:c69aee219197d72829174a2a8071fe51c6bf89a4/version:1499954508/sitraffic-escos-de.pdf; 2019.

"Traffic data analysis in Sitraffic Scala/Concert", retrieved from the internet on Sep. 24, 2019: https://www.mobility.siemens.com/mobility/glo-bal/SiteCollectionDocuments/de/road-solutions/urban/traffic-control-center/verkehrsdatenanalyse.pdf; 2019.

Mou, Luntian et al: "T-LSTM: A Lang Short-Term Memory Neural Network Enhanced by Temporal Information for Traffic Flow Prediction", IEEE Access; Bd. 7 ; pp. 98053-98060; XP011738042; DOI: 10.1109/ACCESS.2019.2929692.

\* cited by examiner

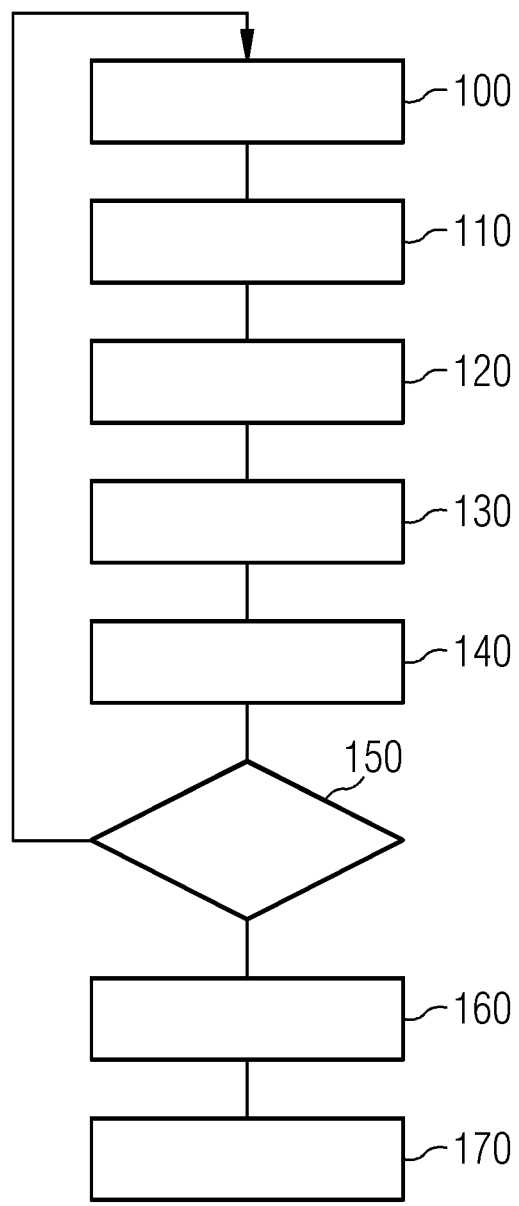

METHOD AND ARRANGEMENT FOR PREDICTING SWITCHING TIMES OF A SIGNAL GROUP OF A SIGNAL INSTALLATION FOR CONTROLLING A FLOW OF TRAFFIC

CROSS-REFERENCE TO RELATED APPLICATIONS

This application claims priority to PCT Application No. PCT/EP2020/081561, having a filing date of Nov. 10, 2020, which claims priority to DE Application No.10 2019 218 903.2, having a filing date of Dec. 4, 2019, the entire contents both of which are hereby incorporated by reference.

FIELD OF TECHNOLOGY

It is known practice in the conventional art to provide signal installations having signal groups at road junctions in order to control traffic through the junction. To this end, the signal installations are actuated by a control program that stipulates a signal state of the signal groups.

BACKGROUND

The document "Verkehrsdatenanalyse in Sitraffic Scala/Concert, Das Expertensystem für Visualisierung, Qualitätsmanagement und Statistik", available on the Internet on Sep. 24, 2019 at https:///www.mobility.siemens.com/mobility/global/SiteCollectionDocuments/de/road-solutions/urban/traffic-control-center/verkehrsdatenanalyse.pdf, discloses various types of traffic-related equipment at road junctions. Besides signal installations that regulate the traffic, detector systems are used that measure the volume of traffic. Associated data processing involves, inter alia, acquiring public transport telegrams, the exact signaling states of the signal installations and detector data.

The document "Sitraffic ESCos, Das kooperative Verkehrssystem für die digitale Straße", available on the Internet on Sep. 24, 2019 at https://assets.new.siemens.com/siemens/assets/api/uuid:c69aee219197d72829174a2a8071fe51c6bf89a4/version:1499954508/sitraffic-escos-de.pdf, discloses realtime data interchange between vehicles and a traffic infrastructure by means of so-called roadside units and central modules. On the one hand, the vehicles receive realtime information from the roadside units, for example relating to red/green phases of signal installations, and on the other hand the vehicles serve as mobile traffic detectors, the information of which is combined in the central modules. The roadside units are WLAN-based radio modules that are mounted for example on sign gantries and signal installations and operate both as transmitters and receivers. As receivers, the roadside units process not only status reports from vehicles, which are provided 10 times per second as part of car-to-infrastructure communication, for example, but also data from environment detectors, traffic-control devices and traffic control centers. The communication between the roadside units and the central modules takes place by radio or by way of existing cable networks.

In general, public transport telegrams are also processed in transport networks. Public transport telegrams are often sent by local public transport vehicles. In this case, the public transport telegrams include for example the date, the time, a service number and a deviation from schedule. The public transport telegrams are received by signal installations, for example, evaluated in situ and forwarded to a control center for superordinate evaluation.

These transport networks have need of prediction of switching times of signal installations, that is to say for example the remaining time left in a green or red phase, or future green phases of multiple signal installations along a scheduled path of travel of a vehicle. Such forecasts can be derived from time series data of the relevant signal installations and further information sources. As such, DE 10 2017 213 350 A1 describes a method for predicting switching times of a signal group of a signal installation for controlling a flow of traffic, in which real state information, which influences the switching times of the signal group, is received at a fixed clock rate, and a computing unit predicts at least one switching time of the signal group at the fixed clock rate by using artificial intelligence to which the real state information is supplied.

However, there is the problem that the time series data needed for a forecast in real time do not always arrive on time.

Existing solutions for filling data gaps in time series make simple assumptions about the temporal context of the information conveyed. It is known practice to fill gaps in time series data with the most recently received information value until the disconnection is resolved. Alternatively, it is known practice to form the value used for filling by way of aggregation over a longer past time horizon, for example as a mean value over the most recently received ten seconds of received data.

SUMMARY

An aspect relates to provide an improved method and an improved arrangement for predicting switching times of a signal group of a signal installation.

The method for predicting switching times of a signal group of a signal installation for controlling a flow of traffic involves real state information, which influences the switching times of the signal group, being received at a fixed clock rate. A computing unit predicts at least one switching time of the signal group at the fixed clock rate by using artificial intelligence to which the real state information is supplied. The method is characterized in that the real state information is supplied to a first neural network as input signals. The first neural network computes estimated state information as a replacement for real state information or parts of the real state information that is/are not received on time or is/are received erroneously for a current time at the fixed clock rate. The first neural network outputs the estimated state information for the current time to the artificial intelligence at the fixed clock rate, the estimated state information replacing the real state information or the parts of the real state information that was/were not received on time or was/were received erroneously.

Alternatively, the method is characterized in that the artificial intelligence is a third neural network to which the real state information is supplied as input signals. The third neural network computes estimated state information as a replacement for real state information or parts of the real state information that is/are not received on time or is/are received erroneously for a current time at the fixed clock rate. The third neural network uses the estimated state information for the current time at the fixed clock rate in order to predict the at least one switching time of the signal group, the estimated state information replacing the real state information or the parts of the real state information that was/were not received on time or was/were received erroneously.

The arrangement for predicting switching times of a signal group of a signal installation for controlling a flow of traffic has an interface, configured to receive real state information, which influences the switching times of the signal group, at a fixed clock rate. It also contains a computing unit, configured to predict at least one switching time of the signal group at the fixed clock rate by using artificial intelligence to which the real state information is supplied. The arrangement is characterized by a first neural network to which the real state information is supplied as input signals. The first neural network is configured to compute estimated state information as a replacement for real state information or parts of the real state information that is/are not received on time or is/are received erroneously for a current time at the fixed clock rate. The arrangement is configured to output the estimated state information for the current time to the artificial intelligence at the fixed clock rate, the estimated state information replacing the real state information or the parts of the real state information that was/were not received on time or was/were received erroneously.

Alternatively, the arrangement is characterized by a third neural network, which influences the artificial intelligence and to which the real state information is supplied as input signals. The third neural network is configured to compute estimated state information as a replacement for real state information or parts of the real state information that is/are not received on time or is/are received erroneously for a current time at the fixed clock rate. The third neural network is configured to use the estimated state information for the current time at the fixed clock rate in order to predict the at least one switching time of the signal group, the estimated state information replacing the real state information or the parts of the real state information that was/were not received on time or was/were received erroneously.

The switching time is the time at which the signal group changes over from one signal state to a subsequent signal state.

By way of example, the real state information for the current time is received incompletely at the fixed clock rate. The first neural network replaces missing parts of the real state information with appropriate parts of the estimated state information for the current time and outputs said estimated state information to the artificial intelligence. To this end, the state information for the current time is combined in an external state vector, for example. Missing parts of the real state information may then be replaced by replacing the applicable components of the state vector with estimated state information, or the parts thereof, that the first neural network has computed.

The flow of traffic controlled by the signal installation is a flow of traffic in road transport, for example. In principle, however, the signal installation may control any flows of traffic, for example in rail transport, in shipping or in aviation, and also at nodes between multiple instances of these categories.

The task of the artificial intelligence is for example to compute the remaining time before the next switching times of all signal installations within a district. Additionally, the artificial intelligence may also make a probability statement about the future states of the signal installations (for example the red/green state thereof). Such artificial intelligence is known from DE 10 2017 213 350 A1, for example.

The first neural network is not the artificial intelligence itself. This in turn may itself be in the form of a neural network, however, in particular in the form of a recurrent neural network. These networks have achieved good results for the prediction of switching times between the signal states of a signal group of a signal installation. The first neural network and the artificial intelligence may be executed on the same computing unit or on different computing units, which are situated at the same location or at different locations.

The fixed clock rate is designed such that the state information is supplied to the artificial intelligence once every second, for example. Alternatively, the state information may also be provided after every tenth of a second or every two seconds, for example.

The first neural network permits the artificial intelligence to make good predictions for the switching times of the signal groups of the signal installation even if one of the many communication links involved fails or is overloaded. The quality and availability of forecast is therefore substantially increased by the first neural network, since, with the estimated state information of the first neural network, the artificial intelligence is supplied with an estimated system state instead of waiting until the real state information has finally arrived at the artificial intelligence. Signal group states are therefore able to be forecast at a fixed clock rate in real time with a high level of robustness and tolerance toward gaps at the clock rate of the real state information provided.

The first neural network and the artificial intelligence are situated for example beside a control unit of the signal installation, in a roadside unit, in a vehicle, or in a cloud. To this end, a suitable module may be installed and appropriately configured beside the control unit or in the roadside unit, for example. This module may contain just the artificial intelligence or also, additionally, the first neural network. It goes without saying that multiple artificial intelligences may also be employed at different locations.

In an embodiment, the first neural network is operated directly next to the artificial intelligence, with the result that communication failures or delays cannot arise between the first neural network and the artificial intelligence. In particular, the functions of the first neural network and the artificial intelligence may also be combined in a third neural network, which then replaces the first neural network and the artificial intelligence.

The proposed method allows more accurate information to be obtained about a remaining time for the current signal state of the signal installation. The information about the switching time, or the remaining time for the present signal state, of the signal group may be displayed or transmitted to vehicles. It is therefore possible for vehicles to take account of the information about the switching time, or the remaining time for a current signal state, when approaching the signal group and, by way of example, to adapt their speed such that the vehicle can pass through the junction, or the signal installation, with as little waiting time at the signal group as possible. Furthermore, an energy consumption of the vehicles may be reduced.

The switching time may be predicted for one signal group of a signal installation or for multiple signal groups of the signal installation. In particular, the switching times may be forecast for all signal groups of the signal installation, i.e. for all signal groups of a traffic light installation at a junction.

By way of example, the forecast for the switching time, or the switching times, between two signal states is carried out for a stipulated future period, in particular for 30 seconds or up to 120 seconds or longer. Multiple changes of signal states and hence multiple switching times between two successive signal states may also be forecast. It is therefore possible to ascertain not just the next switching time but rather multiple future switching times between signal states. This allows a longer-term forecast for the switching behavior of the signal group of the signal installation.

A further improvement in the artificial intelligence is that, in addition to the switching time, or the remaining time for the present signal state, a probability is ascertained for the remaining time for the present signal state. The probability can be used by a driver or a vehicle to assess the reliability of the forecast remaining time for the signal state and hence to obtain more precise information about the future switching behavior of the signal group. By way of example, a probability of a green signal occurring is ascertained for the green signal from a signal group. The probability of the signal states, i.e. for example the probability of a green signal from the signal group, may be estimated for a predefined time forecast horizon into the future, for example for 120 seconds or longer.

The predictions of the artificial intelligence may in turn be communicated to vehicles, which use them to save energy by optimizing their speed of travel. In principle, it is also possible to arrange the artificial intelligence in the vehicle, with the result that the vehicle itself is able to predict the red and green times of all signal installations along its route. In this application scenario too, the first neural network permits a more robust prediction of switching phases given incomplete time series data.

Compared to the methods for filling in incomplete time series data that were explained at the outset, the first neural network affords the advantage that it is also possible to predict spontaneous changes in the remaining cycle for the signal groups of the signal installation by suitably training the first neural network to fill the gaps in the time series data as informatively as possible. The first neural network fills the gaps intelligently and predictively, and is also capable of learning sudden changes. This makes the forecast much more informative than if gaps in the time series data are filled merely with the most recently received values, since in this case changeovers by the signal groups and also detector triggers that can be expected are not represented in the filled-in state information.

The first neural network affords advantages not only while the artificial intelligence is operating, however, but also while the artificial intelligence is being trained. This is because the first neural network can be used by the artificial intelligence to learn more accurate and more stable models for forecasting the switching times. These forecast models may also be used in environments having an unreliable sensor system or problems with the data transmission.

The explanations above apply analogously to the third neural network, which combines the functions of the first neural network and the artificial intelligence, or the second neural network.

According to one embodiment, the real state information includes signal group states, in particular from the signal installation and/or from multiple or all signal installations in an area, system states, in particular from a control unit of the signal installation and/or from control units of multiple or all signal installations in an area, detector values, in particular from the signal installation and/or from multiple or all signal installations in an area, and/or messages from vehicles, in particular reports and/or requests from public means of transport, in particular public transport telegrams.

The system states comprise for example a current time and/or information relating to the current day of the week, calendar day or holiday, information about a control program controlling the signal installation, in particular a cycle time and/or a rotation time, information concerning whether a central controller for multiple signal installations or a local controller is involved, and/or whether there is a fixed time controller or a traffic-dependent controller.

The real state information depicts the system state of a control device of the signal installation, for example. However, it is advantageous to take account of past and present states of all surrounding signal installations and of all road users in the vicinity in order to forecast the remaining time and the future red/green states of the signal installation. In this case, the real state information may thus also include states of the surrounding signal installations and of the vehicles in the vicinity.

In one development, the first neural network is a historically consistent neural network that continually computes the estimated state information for the current time at the fixed clock rate.

The historically consistent neural network (closed historically consistent neural network, HCNN) thus uses the estimated state information to continually compute an estimate of the current system state at the fixed clock rate, said estimate being able to be used as an input for the artificial intelligence in order to compute the switching times of the signal installation.

The design of the historically consistent neural network, as shown in FIGS. 4 and 5, permits the first neural network to be easily extended. The basic architecture of the first neural network can thus be extended in modular fashion without needing to reformulate the whole modeling problem. Simple adaptation can be achieved by extending input data of an availability mask.

According to one embodiment, the following steps are carried out if the real state information is received on time for the current time at the fixed clock rate: the first neural network determines an inconsistency between the real state information and the estimated state information for the current time and uses said inconsistency for error correction. The artificial intelligence is supplied with the real state information for the current time at the fixed clock rate.

If the current real state information, that is to say the system state to be monitored, arrived on time at the fixed clock rate, the structure of the first neural network uses the inconsistencies (errors) between the measured variables and its own estimate as additional input variables and thereby corrects its internal estimate of the next system state.

In other words, the first neural network forecasts the system state to be measured (represented by the state information) on the basis of the last internal state and rolls out the latter one time step into the future. If the current real state information arrives on time within a tolerated time window over all communication links, this information may exhibit an error compared to the corresponding current estimated state information, said error being used by the first neural network as an input.

If the current real state information does not arrive on time at the fixed clock rate, in one possible implementation the first neural network sets the inconsistency, or the input signal for the error, to the value zero, which leads to the internal clock of the first neural network continuing to run and the first neural network outputting its state information estimated for the current time to the artificial intelligence. A distinction may be drawn between individual external state values in this instance, for example by setting the error to zero only for the external state values that are missing in an external state vector or are erroneous.

In one development, past real state information for a past time is received subsequently behind time. The first neural network determines an inconsistency between the past real state information and past estimated state information and uses said inconsistency for error correction.

This has the advantage that the first neural network can take account of the ascertained inconsistency between the past real state information and the past estimated state information for the next estimate of the current state information.

According to one embodiment, the first neural network and/or the artificial intelligence are executed in an external computing unit, in particular in a cloud.

Depending on the chosen embodiment, the whole forecast of the switching times, or the remaining time, may thus be executed in the external computing unit. This allows computing time to be saved in the computing unit of the signal installation. This requires data communication between the computing unit of the signal installation and the external computing unit. Said data communication may be performed wirelessly or by wire, for example.

In one development, the first neural network is trained with real state information beforehand in such a way that it learns the estimate of the state information for the current time.

The training of the first neural network involves the state information estimated for the current time being compared with the real state information actually received for the current time. From the comparison, a backpropagation method is used to adapt the variables of the first neural network, that is to say in particular to adapt the elements of a matrix A. The adaptation is carried out in such a way that the first neural network forecasts the state information estimated for the current time more precisely. A first neural network is therefore provided that is implemented in hardware and/or software and has the properties and structures described with reference to the method.

According to one embodiment, at least part of the training of the first neural network is carried out in an external computing unit, in particular in a cloud. After the conclusion of the training the trained first neural network is transmitted to a computing unit of the signal installation.

This saves computation capacity of the computing unit of the signal installation.

In one development, the first neural network is trained at predefined intervals of time during the operation of the signal installation and the prediction of the switching times, and then the newly trained first neural network is used.

Training the first neural network during the operation of the signal installation allows continuous adaptation of the first neural network. Regular adaptation of the model of the first neural network may lead to an improved estimate of the state information. In particular, regular training of the first neural network allows an altered volume of traffic to be taken into account, for example.

According to one embodiment, the first neural network processes at least one piece of state information containing further non-observables in an internal state vector.

Non-observables are hidden variables that cannot be observed. All of the modeling may therefore take place in the first neural network. It is not necessary to learn any secondary representations, for example for coding further influences. This reduces the training time for the first neural network.

The computer-readable data carrier stores a computer program product (non-transitory computer readable storage medium having instructions, which when executed by a processor, perform actions) that performs the method when it is executed in a processor.

The computer program is executed in a processor and in so being performs the method.

BRIEF DESCRIPTION

Some of the embodiments will be described in detail, with reference to the following figures, wherein like designations denote like members, wherein:

FIG. 7 shows a schematic program sequence for carrying out the method described.

DETAILED DESCRIPTION

Figure 1:
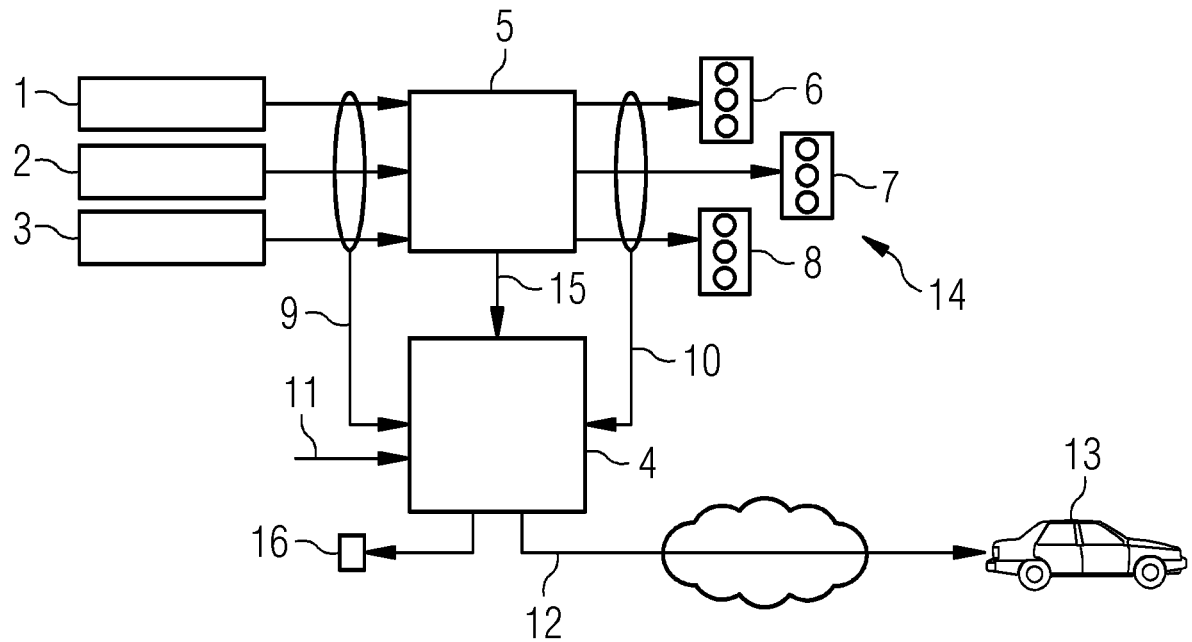
FIG. 1 shows a schematic representation of a traffic light installation.

Modern traffic light installations for controlling traffic on roads have the task of controlling the traffic with the shortest possible waiting times at the traffic light installations for a high flow rate of vehicles. This involves e.g. employing phased traffic light methods in order to achieve the smoothest possible traffic with a relatively high average speed and short idling times at signal installations.

Good traffic control can be achieved by providing the road users, in particular the vehicles, with information about future signal states of a signal group of a signal installation and in particular with information about future switching times between future signal states of a signal group of a signal installation. The future signal states, or the switching times for the change of signal states, of the signal installation may be transmitted to the vehicles wirelessly from switching stations at the roadside or by mobile radio from an external computing unit, for example. This allows a driver of a vehicle or a control unit of the vehicle e.g. to ascertain or stipulate an optimized speed that is advantageous to the vehicle. The optimized speed may be computed on the basis of the current location of the vehicle, which is known from GPS information, for example, the location of the signal group and the expected switching time of the signal group.

An artificial intelligence forecasts the remaining time for a signal state of a signal group of a signal installation before the next switching time. A further improvement may be achieved by additionally ascertaining a probability of the remaining time left before the next switching time of the signal state and in particular conveying said probability to the road users.

The artificial intelligence processes real state information, which influences the switching times of the signal group and is received at a fixed clock rate. The real state information is supplied as input signals to a first neural network, which is different than the artificial intelligence. The first neural network computes estimated state information as a replacement for real state information or parts of the real state information that is/are not received on time or is/are received erroneously for a current time at the fixed clock rate. The first neural network outputs the estimated state information for the current time to the artificial intelligence at the fixed clock rate, the estimated state information replacing the real state information or the parts of the real state information that was/were not received on time or was/were received erroneously.

The prediction by the artificial intelligence may be applied to individual signal installations having one or more signal groups, multiple signal installations having multiple signal groups and a combination of signal installations and signal groups. The prediction about the switching times for the signal states and the probabilities of the forecast signal states, or remaining times, may be ascertained for a predefined time horizon in the future. Forecasting the switching times may be a classification problem that is optimized by means of a cross entropy. The result obtained for the forecast by the artificial intelligence is a probability distribution for the signal state of the respective signal group over the time forecast horizon.

A forecast model for the switching times that is modeled using the artificial intelligence can perform two tasks: it learns a switching behavior of the signal groups of the signal installation in data-based fashion and, on the basis of the time of day, the day of the week and the holiday, a system model of the traffic streams, as recorded by detectors, for example, and the resultant switching behavior of the signal groups of the signal installation. In an embodiment the forecast model may be created by way of methods for modeling dynamic systems.

Figure 3:
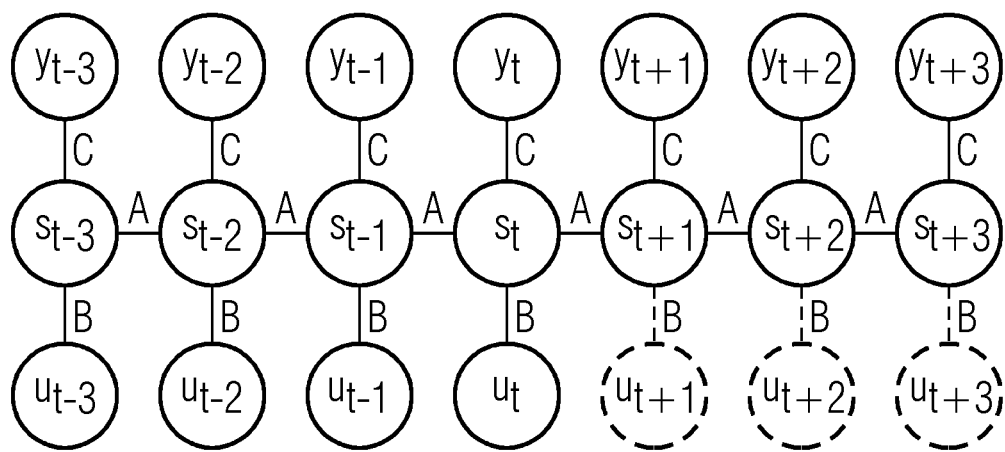
FIG. 3 shows a schematic representation of an embodiment of a second neural network.

In particular the second neural network shown in FIG. 3, for example, a recurrent neural network, is suitable for implementing the artificial intelligence. By way of example, the following architectures and networks may be used for implementing the artificial intelligence: recurrent neural networks, fixed-point/convergence networks, Elman/Jordan networks, ECNN, causal-retro-causal networks, LSTM, gated recurrent units. Neural networks allow a statement relating to the reliability of forecasts of the switching states, or of the switching times, to be delivered, and reliable states to be distinguished from unreliable states. Possibilities in this regard are: the derivation of uncertainty from a model error, dispersion of the output from models, the derivation of a bandwidth of a conditional density estimation, generation of model output by way of scenario formation. Moreover, the second neural network shown in FIG. 3 may be capable of learning statistical and system-inherent dynamic relationships between input variables and output variables. By way of example, the second neural network may learn an increased volume of traffic at a specific time of day and, in light of these statistical relationships, forecast a higher probability of red for a given signal group at this time, for example.

A switching time is understood to mean the time at which a signal group performs a signal change. By way of example, the signal group may change over from the go signal, which is indicated by a green signal, for example, to don't go, which is indicated by a red signal, for example. This may be formalized as a regression problem between a genuine switching time and a forecast switching time. The architecture of the forecast model may be capable of reproducing a certain memory effect.

The artificial intelligence may provide a forecast matrix that includes a forecast probability of a signal state for each time in a predefined time window and for each signal group of a signal installation. By way of example, the forecast matrix may include a probability of a green signal from a signal group or a probability of a red signal from a signal group for each time window. This task may be accomplished using a multi-objective learning problem. A forecast of signal states, in particular probabilities of signal states and remaining time forecasts before the changeover time from one signal state to the next signal state, may be accomplished for all signal groups of a signal installation by using a neural network that solves the learning problem dynamically and in integrated fashion.

The artificial intelligence requires no information about an exact circuit layout of the traffic light installation and also no expert knowledge about the causal relationships in a traffic controller. It has a high level of scalability in regard to application to different traffic light installations, since the artificial intelligence needs to be calibrated or trained only on the basis of a given dataset. Furthermore, the forecast model can be used in real time and can be retrained for current data at any time. An additional advantage is afforded by a generalization capability, which permits the system to be transferred to junctions having arbitrary complexity without expert knowledge.

Neural networks are parametric functions that may be trained in data-driven fashion using stochastic gradient descent methods. As such, the neural networks are capable of recognizing nonlinear relationships without expert knowledge. Similarly, one of the technical features of neural networks is that the architecture used permits an integrated forecast of switching time and switching state. Recurrent neural networks allow a higher quality of forecast, since they are capable of better reproducing the underlying dynamics of the system to be modeled and also memory effects that occur than pure input/output models, such as for example feedforward networks.

FIG. 1 shows a schematic representation of a design of a signal installation 14 having three signal groups 6, 7, 8. The signal installation 14 has a control unit 5 that is connected to detectors 1, 2, 3. The detectors 1, 2, 3 record various parameters for traffic on at least one road on which the signal installation 14 having the signal groups 6, 7, 8 is arranged. The detectors 1, 2, 3 are used to record e.g. vehicles on the road. This allows a density of vehicles on the road or roads to be taken as a basis for controlling the signal installation 14 in a manner matched to the traffic. Moreover, there is provision for a computing unit 4 that either receives information about the traffic on the road directly from the detectors 1, 2, 3 or receives information about the traffic via the control unit 5. In this way, the computing unit 4 also receives the information about the traffic, in particular about the traffic density on the road(s) of a junction. The data from the detectors 1, 2, 3 are received e.g. by the computing unit 4 via a first input 9.

The control unit 5 has a data memory and has control programs that are used, on the basis of various parameters and in particular on the basis of traffic data recorded using the detectors 1, 2, 3, to actuate the signal groups 6, 7, 8 of the signal installation 14 in such a way that a desired flow of traffic can take place on the road, in particular through a junction.

The signal groups 6, 7, 8 are in the form of light signal groups in the embodiment shown. Each signal group has a display for red light, a display for amber light and a display for green light. The meaning of the individual light colors for traffic is laid down on a country-specific basis.

Depending on the chosen embodiment, the signal groups 6, 7, 8 may also comprise other signals in order to give clearance to go or to stop traffic. The control unit 5 also forwards the control signals for the signal groups of the signal installation to a second input 10 of the computing unit 4. The computing unit 4 therefore also has the information concerning which signal group is displaying which signal. Moreover, there is provision for a fourth input 15 that the control unit 5 uses to send the computing unit 4 further information about the control program that the control unit 5 uses to actuate the signal installation 14 having the signal groups 6, 7, 8. The information about the control program may include for example the rotation time, information about whether a central controller, a local controller or a controller that may be activated by the traffic is involved, whether there are errors in the controller or in the traffic light installation, whether a traffic-dependent controller is involved, whether there is an error on the detector, whether a higher-level controller or a central controller is involved, what state the control unit is in, etc.

The computing unit 4 furthermore has a third input 11 via which further information is obtained. The further information may comprise for example traffic information, information about a public means of transport, a report by a public means of transport at a reporting point or a request to go by a public means of transport, etc. The report by the means of transport may comprise for example information about the type of the means of transport or an identifier of the means of transport, such as for example a service number of the means of transport. A public means of transport may be a bus, a tram, etc. Moreover, the computing unit 4 has a time unit that can be used to determine the current time. Furthermore, the computing unit 4 has information concerning what time of day, what day of the week, what month, what calendar day, what year, etc., it is. Moreover, information about a current holiday may also be available to the computing unit 4 or made available via the third input 11.

Furthermore, the computing unit 4 may be sent information about the traffic, for example traffic reports, via the third input 11. Traffic reports may be for example information about accidents, queues, high volume of traffic, closure of a road, etc.

The computing unit 4 has the first neural network explained above in the form of a computer program and/or in the form of hardware circuits, said neural network also being explained in more detail later on in conjunction with FIGS. 4 and 5. The first neural network receives for example the signals from the first input 9, the second input 10, the third input 11 and the fourth input 15 as real state information, which influences the switching times of the signal groups 6, 7, 8, at a fixed clock rate. As such, the real state information may comprise for example:

signal group states of the signal groups 6, 7, 8, which for example are recorded by detectors or ascertained on the basis of the control signals applied via the second input 10, system states, in particular from the control unit 5 of the signal installation 14, which are received via the fourth input 15, detector values, in particular from the detectors 1, 2, 3 of the signal installation 14, which are received via the first input 9, and/or messages from vehicles, in particular reports and/or requests from public means of transport, in particular public transport telegrams, which are received via the third input 11.

The computing unit 4 additionally has the artificial intelligence explained above in the form of a computer program and/or in the form of hardware circuits. The artificial intelligence, to which the real state information is supplied, predicts at least one switching time of the signal group at the fixed clock rate.

The first neural network computes estimated state information as a replacement for real state information or parts of the real state information that is/are not received on time or is/are received erroneously for a current time at the fixed clock rate. The first neural network outputs the estimated state information for the current time to the artificial intelligence at the fixed clock rate, the estimated state information replacing the real state information or the parts of the real state information that was/were not received on time or was/were received erroneously. The artificial intelligence is for example a second neural network, as shown in FIG. 3.

The computing unit 4 may comprise both the first neural network and the artificial intelligence. Instead of the computing unit 4, however, there may also be provision for two computing units, which are arranged adjacently. In this variant, one of the two computing units executes the first neural network and the other computing unit executes the artificial intelligence. The computing unit on which the artificial intelligence is executed is a dedicated piece of hardware, for example. In an embodiment, the control unit 5 is a Sitraffic sX traffic control device or a control device from the Sitraffic C900 family, for example.

The first neural network allows the artificial intelligence to make a useful forecast of the switching times to be expected for the signal groups 6, 7, 8 at a fixed clock rate (for example once per second) and to provide said forecast for the vehicles 13 situated in the surroundings, specifically even if the communication path between the computing unit 4 and the control unit 5 is disrupted for various reasons during operation.

In the event of such disruptions, the internal time in the control unit 5 continues to run inexorably and switching times would be computed either too late compared to real time or incorrectly on account of missing real state information. The first neural network provides a mechanism that allows a more robust forecast at the fixed clock rate in spite of missing or severely delayed data.

The artificial intelligence is designed to take at least one of the available parameters as a basis for forecasting a forecast for a switching time of at least one signal group from one signal state to the next signal state. Depending on the chosen embodiment, the remaining length of time for the present, current signal state and also switching times between future signal states of the signal group may therefore be forecast for at least one signal group. The time horizon up to which the signal characteristic and hence the switching times between the signal states of a signal group are forecast may be in the range from a few seconds to 30 seconds and also longer than 30 seconds. The forecast may ascertain a probability of the forecast remaining length of time for the current signal state of a signal group. Furthermore, a probability of the forecast length of time and the forecast switching times between the signal states may also be ascertained for future signal states.

The ascertainment of the switching times between signal states of a signal group may be updated at stipulated intervals of time. By way of example, the switching times between the signal states of the signal group may be forecast every second for the predefined future time horizon of for example greater than 30 seconds, in particular greater than 120 seconds. Moreover, the probabilities of the signal states of the signal group may also be ascertained every second. A remaining period for the present signal state of the signal group is thus ascertained at the same time. Depending on the chosen embodiment, the computing unit 4 may be designed to ascertain the switching times for a transition between signal states of the signal installations for a predefined future time horizon for multiple signal groups of the signal installation, in particular for all signal groups of the signal installation. Moreover, the computing unit 4 may also be designed to ascertain the probabilities of the remaining lengths of time for the current signal states of the signal groups of the signal installation for multiple signal groups 6, 7, 8, in particular for all signal groups, of the signal installation.

Furthermore, the switching times and the probabilities of the next signal states of the signal groups may also be ascertained for the change of further signal states of the signal groups of the signal installation. Moreover, depending on the chosen embodiment, the computing unit 4 may be designed to ascertain the switching times of the signal groups of the signal installations and the probabilities of the signal states of the signal groups of the signal installation for multiple signal installations. The computing unit 4 and the control unit 5 may also be produced in a single computing unit, depending on the chosen embodiment. The probabilities are ascertained by the computing unit 4 from a learnt historical comparison of the forecast switching times with the actually measured switching times. Switching times for specific traffic situations and states of the signal installation are forecast for a stipulated future period.

Subsequently, measurement using detectors checks the probability of the forecast signal states actually having occurred. Depending on the chosen embodiment, other methods may also be used to ascertain the probabilities of the signal states.

Depending on the chosen embodiment, at least one future switching time or a remaining time for the current signal state or a length of time for a future signal state is transmitted from the computing unit 4 to a vehicle 13 via an output 12, for example wirelessly. Depending on the chosen embodiment, the switching times of future transitions between signal states for a predefined future time horizon of at least one of the signal groups of the signal installation, in particular all signal groups of the signal installation, may be conveyed to the vehicle 13.

Depending on the chosen embodiment, the lengths of time for the current signal states of the signal groups and the lengths of time for the future signal states of the signal groups for a predefined future time horizon may be conveyed to the vehicle 13 for at least one of the signal groups of the signal installation, in particular for all signal groups of the signal installation. Furthermore, this information may also be conveyed to an external computing unit 16.

The vehicle 13 and/or the external computing unit 16 may use the conveyed information about the future switching times of the signal groups of the signal installation and/or the lengths of time for the current and/or the future signal states of the signal groups and/or the probabilities of the current and/or the future signal states of the signal groups for statistical evaluation, journey planning for a route of travel and/or control of a speed of the vehicle or output of information to a driver.

By way of example, the data may be used in the vehicle 13 by a control unit for automatically controlling a speed of the vehicle. Moreover, the information may be read into a navigation system, or navigation program, in the vehicle 13 and taken into account for route planning. Furthermore, the information may be displayed to the driver by way of a display, for example a display of a mobile phone or a display of an integrated navigation system. The external computing unit 16 may also be designed to convey the conveyed information about the future switching times of the signal groups of the signal installation and the probabilities thereof to vehicles 13 wirelessly.

The external computing unit 16 may be implemented as a cloud or as an individual external computing unit. Depending on the chosen embodiment, the real state information recorded by the computing unit 4 may also be transmitted to the external computing unit 16.

In this variant, the real state information is thus transmitted to a cloud, for example, as the computing unit 16. The first neural network and the artificial intelligence may likewise be executed in the cloud, since purely sending the real state information gives rise to less data traffic on an LTE link than when the forecast values are also transmitted at the same time. On this link too, packets may potentially be lost or reach the cloud after a severe delay. The cause of this is for example firstly overloading of the mobile radio network or secondly failure of hardware components between the local transmission unit and the first neural network in the cloud. These transmission losses may also advantageously be compensated for by the first neural network in the cloud.

If the first neural network and the artificial intelligence are installed and executed both locally at the signal installation 14 and in the cloud, the forecasts by the artificial intelligence may be made available and used not only locally at the signal installation 14 but also centrally, for example by navigation system providers, automobile OEMs and city administrators.

Moreover, the external computing unit 16 may be designed to train the first neural network and/or the artificial intelligence and to implement the applicable models for predicting the state information, or the switching times, and the probability of the signal states.

The trained first neural network and/or the trained artificial intelligence may subsequently be transmitted to the computing unit 4 as a computing program. The interface between the external computing unit 16 and the computing unit 4 may be in wireless or else wired form. Furthermore, depending on the chosen embodiment, the external computing unit 16 may also compute the forecast for the switching times and/or compute the probabilities of the signal states. The external computing unit 16 may therefore convey the ascertained probabilities of the current and future signal states of the signal groups and the ascertained future switching times of the signal groups to the computing unit 4. Depending on the chosen embodiment, the external computing unit 16 may be designed to convey the information about the switching times and the probabilities of the switching times to further computing units, or to the vehicles 13. Moreover, the computing unit 4 may convey the switching times of the signal groups and/or the probabilities of the signal states to the vehicles 13 wirelessly, for example.

Depending on the chosen embodiment, the computing unit 4 and/or the external computing unit 16 may train the first neural network and/or the artificial intelligence. By way of example, the data that the computing unit 4 requires in order to forecast the switching times and/or the probabilities of the signal states may be requested from the control unit 5 via a data connection. By way of example, the parameters may be queried and obtained from the control unit 5 every second. Moreover, the data required for training the model may be transmitted from the computing unit 4 and/or from the control unit 5 to the external computing unit 16 every second.

Depending on the chosen embodiment, only the computing unit 4 may also train the first neural network and/or the artificial intelligence. Moreover, the first neural network and/or the artificial intelligence may be conveyed to the computing unit 4 externally.

The artificial intelligence may be trained e.g. using a backpropagation method from S. Haykin, Neural Networks: A Comprehensive Foundation, Macmillan College Publishing Company, Second Edition, ISBN 0-13-273350-1, pages 732 to 789, 1999. This known training method involves the cost function being minimized in the next training phase.

Alternatively, the functions of the first neural network and the artificial intelligence may also be combined in a third neural network, which replaces the first neural network and the artificial intelligence. The preceding explanations relating to FIG. 1 apply accordingly.

Figure 2:
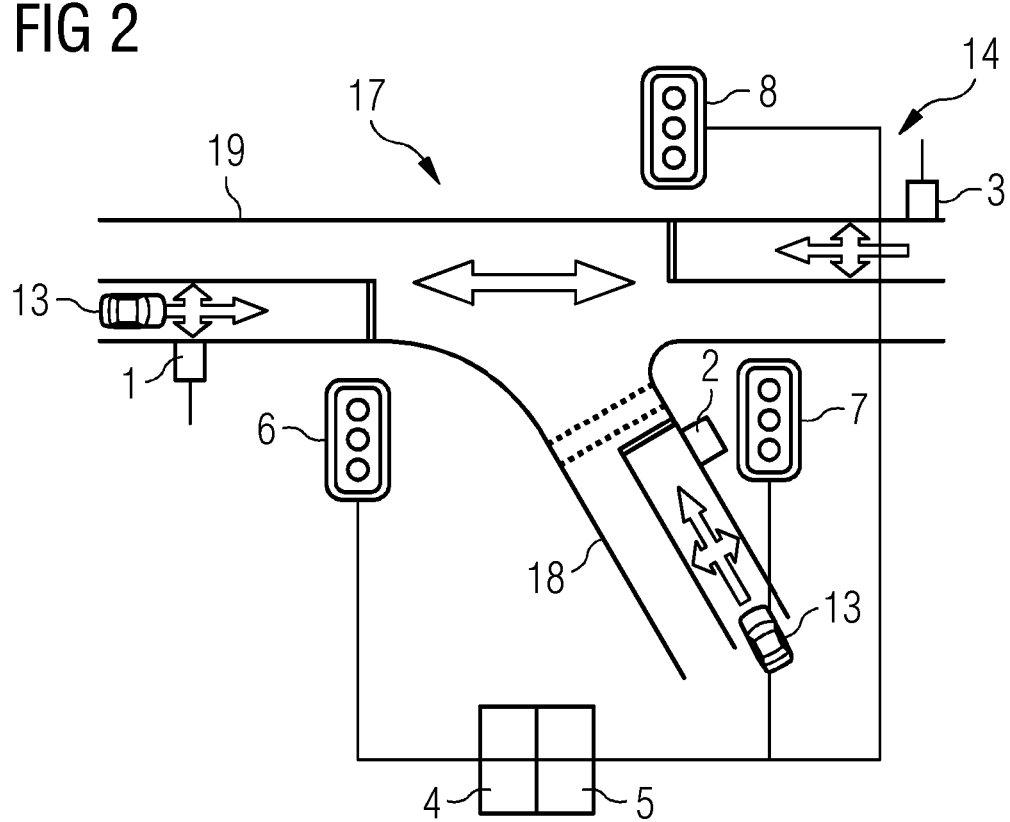
FIG. 2 shows a schematic representation of a road with a junction and a signal installation.

FIG. 2 shows a schematic representation of a junction 17 at which a second road 18 leads into a first road 19, or branches off therefrom. The first signal group 6 and the first detector 1 are arranged on the first road 19 to the left of the junction 17. The second detector 2 and the second signal group 7 are arranged on the second road 18. The third detector 3 and the third signal group 8 are arranged on the first road 19 on the right-hand side of the junction 17. The detectors 1, 2, 3 are connected to the control unit 5 and the computing unit 4. The computing unit 4 and the control unit 5 may also be produced in a single computing unit, depending on the chosen embodiment. By way of example, the computing unit 4 and/or the control unit 5 are arranged in a control box at the roadside. The signal groups 6, 7, 8 of the signal installation 14 are connected to the control unit 5. The detectors 1, 2, 3 are designed to detect vehicles approaching the junction 17. The control unit 5 may therefore carry out traffic-dependent control of the signal states of the signal groups 6, 7, 8 of the signal installation 14 depending on the current volume of traffic.

The control unit 5 may be connected to the computing unit 4 by way of an Ethernet, for example. This connection may be used to convey current real state information about the signal program, the rotation time, the cycle time for actuating the signal states of the signal groups, the data from the detectors, information about reports by public means of transport, etc., at a fixed clock rate, for example every second.

As explained above, the computing unit 4 executes the first neural network and the artificial intelligence, for example. In one variant, these two functions are provided by separate, modular computing units that replace the computing unit 4. In a further variant, one or both functions are alternatively or additionally provided in a cloud.

The artificial intelligence is embodied for example as a second neural network, for example as a recurrent neural network, fixed-point/convergence network, Elman/Jordan network, ECNN, causal-retro-causal network, LSTM or gated recurrent network.

Alternatively, the functions of the first neural network and the artificial intelligence may also be combined in a third neural network, which replaces the first neural network and the artificial intelligence. The preceding explanations relating to FIG. 2 apply accordingly.

FIG. 3 shows a second neural network in the form of a recurrent neural network as a simple schematic example of an implementation of the artificial intelligence.

A basic functionality of the second neural network is explained below. The following equation system 1.1 describes discrete-time states of a dynamic system in a recurrent description:

$s_t = f(s_{t-1}, u_t)$ state transition $y_t = g(s_t)$ output equation (1.1)

A state transition is determined by a preceding internal hidden state of the system $s_{t-1}$ at the time t-1 and the influence of an external parameter $u_t$ at the time t on the new state $s_t$ at the time t. The states $s_t$, $s_{t-1}$, etc., may be parameters or vectors containing multiple parameters. The output equation ascertains the determinable output vector $y_t$. In the case of the signal installation, e.g. the external parameters $u_t$ are the parameters recorded by the detectors. The signal states of the signal groups of the signal installation are the output vector $y_t$.

The task is now to ascertain the dynamic system of equations 1.1, which is determined by the functions f and g, for a present system for controlling the signal installation. This can be accomplished as a result of an averaged difference between measured output vectors $y_t^d$, t=1, ..., T and the computed data $y_t$ for a model being minimized:

$$\frac{1}{T}\sum_{t=1}^{T}(y_t - y_t^d)^2 \to \min_{f,g} \quad (1.2)$$

Equations 1.1 and 1.2 may be defined as a time-delayed recurrent neural network using the following equations:

$s_t = NN(s_{t-1}, u_t, V)$ state transition $yt = NN(s_t; W)$ output equation (1.3)

Specifying the functions f and g as neural networks with parameter vectors v, w has rendered equations 1.3 into a problem for identifying parameters using the following formula:

$$\frac{1}{T}\sum_{t=1}^{T}(y_t - y_t^d)^2 \to \min_{v,w} \quad (1.4)$$

The dynamic system comprising the following two equations may be implemented as the second neural network shown in FIG. 3.

$s_t = \tan h(As_{t-1}, Bu_t)$ state transition $yt = Cs_t$ output equation (1.5)

An input vector u will thus influence the hidden layer with the states $s_t$ at the time t with weights of a two-dimensional matrix B. The hidden layer will transition to the output vector $y_t$ with weights of a two-dimensional matrix C. At the same time, the state $s_{t-1}$ will influence the hidden layer with weights of a two-dimensional matrix A. Moreover, the hidden layer will influence the state $s_t$ with an identity matrix id. The output function $NN(s_t; w)$ is implemented as a linear function in this case.

On these assumptions, the second neural network schematically shown in FIG. 3 may be implemented. The second neural network comprises a hidden layer having the hidden states $s_t$, where t defines an incremental time. Moreover, an input vector $u_t$ will influence the respective hidden state with the weights of the matrix B. Furthermore, an output vector $y_t$ is ascertained from the hidden state $s_t$ with the weights of the matrix C. At the same time, a hidden state $s_{t-1}$ influences the next state $s_t$ with the weights of the matrix A.

A task is now to ascertain the model of the output vector $y_t$ as precisely as possible. In the exemplary embodiment shown, the influence of three preceding states, that is to say $s_{t-3}$, $s_{t-2}$ and $s_{t-1}$, together with the current hidden state $s_t$ is used to ascertain future hidden states $s_{t+1}$, $s_{t+2}$, etc., and also future output vectors $y_{t+1}$, $y_{t+2}$, etc.

A learning method involves the second neural network being trained in such a way that the matrices A, B and C are ascertained, with the result that the output vectors $y_t$ computed using the second neural network correspond to the measured output vectors $y_t$ as accurately as possible. In the present case, the input vectors $u_t$ used to train the second neural network are the parameters that are supplied to the computing unit 4 via the first input 9, the third input 11 and the fourth input 15. Depending on the chosen embodiment, only some of the parameters may also be used as the input vector.

The output vector ascertained is at least one switching time of a signal group from a current signal state to a next signal state. Moreover, depending on the chosen embodiment, the output vector may comprise a probability of a forecast signal state of at least one signal group of the signal installation being correct. Furthermore, the output vector may comprise the switching times between the occurring signal states of the signal group for a predefined time. Moreover, the output vector may comprise probabilities of the signal states of at least one signal group for a predefined forecast period. Moreover, the output vector may comprise the switching times and/or the probabilities of the signal states of multiple signal groups of the signal installation, in particular for all signal groups of the signal installation. The measured output vectors are compared with the computed output vectors. Appropriate adaptation of the matrices A, B and C is used to match the computed output vectors to the measured output vectors. If the difference between the computed output vector and the measured output vector for each parameter is less than 5%, for example, then the learning method is terminated and the model, or the second neural network, is maintained with the matrices A, B, C. This model is used for future prediction of switching times and/or probabilities of the signal states by the computing unit 4.

In a further embodiment, the second neural network used may be a recurrent neural network with error correction. For this method, the system may be described using the following equations:

$$s_t = f(s_{t-1}, u_t, y_{t-1} - y_{t-1}^d) \qquad (1.9)$$
$$yt = g(s_t)$$

Here, $y_t^d$ is the actually measured output vector at the time t. On the basis of equations 1.9, a neural network with error correction may be formulated using the following equations:

$$s_t = \tanh(As_{t-1} + Bu_t + D\tanh(Cs_{t-1} - y_{t-1}^d)) \qquad (1.12)$$
$$yt = Cs_t$$

This equation system is ascertained using parameter optimization, the four matrices A, B, C and D being ascertained according to the following rule:

$$\frac{1}{T}\sum_{t=1}^{T}(y_t - y_t^d)^2 \to \min_{A,B,C,D} \qquad (1.13)$$

A further description of the possible neural networks that can be used for implementing the artificial intelligence may be taken from the article Zimmermann H G., Neuneier R., Grothmann R. (2002) Modeling Dynamic Systems by Error Correction Neutral Networks. In: Soofi A. S., Cao L. (eds.) Modeling and Forecasting Financial Data. Studies in Computational Finance, vol 2. Springer, Boston, MA Moreover, applicable neural networks are described in EP 1 252 566 B1.

Figure 4:
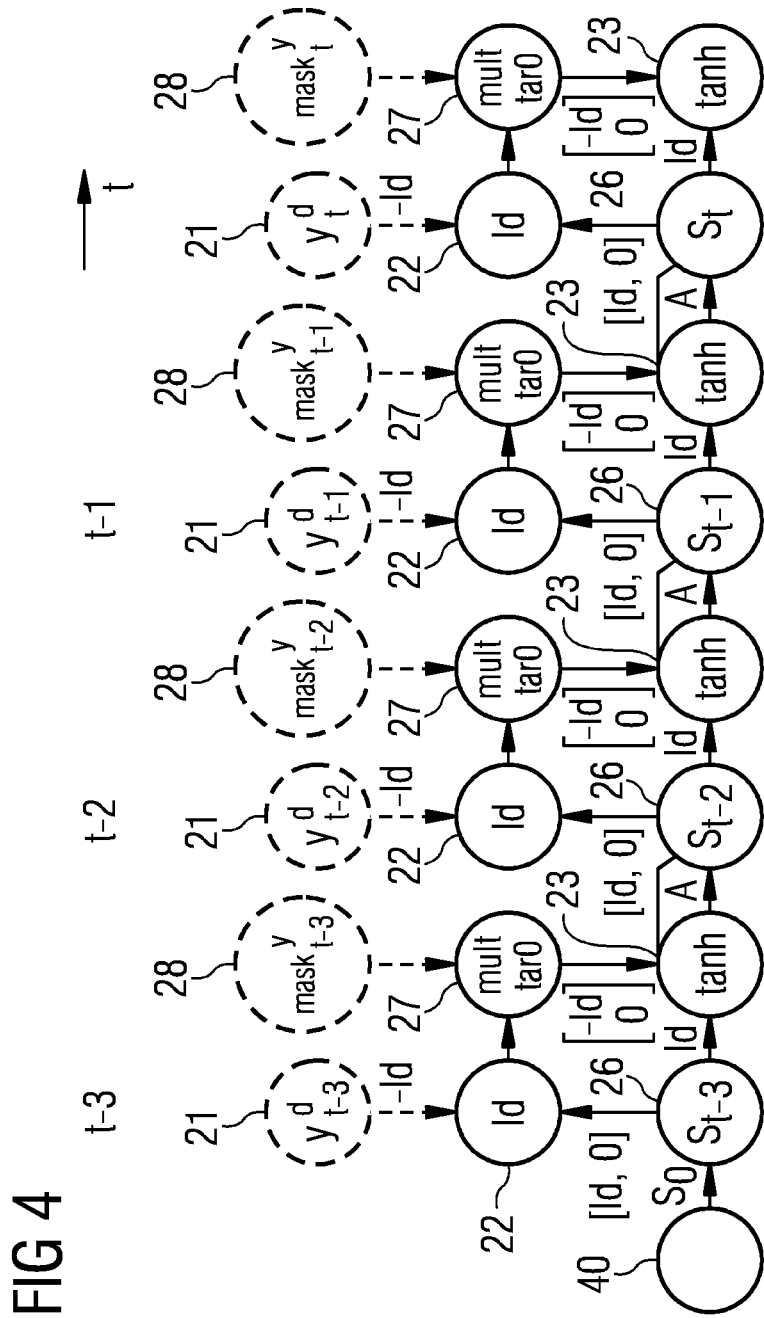
FIG. 4 shows a schematic representation of an embodiment of a first neural network.

FIG. 4 shows a schematic representation of a first neural network having the structure of a closed historically consistent neural network, the functionality of the network being shown for chronologically successive computation steps. A timeline is shown schematically for the time t, the time t running to the right into the future. Respective times t−3, t−2, t−1, t for computation steps of the neural network are shown. In the exemplary embodiment shown, the time characteristic starts at the time t−3 and passes through the times t−2, t−1 to the current time t.

By way of example, the first neural network is implemented in the form of hardware and/or software in a computer. The computer is an arbitrary computing unit, for example a field device.

The representation chosen for the number of computation times t is shown only schematically, since in real cases the times at which computations are performed may extend from a time of t−432, t−288 or t−120 to the current time t, for example.

The first neural network uses an internal state vector $s_t$ that comprises not only non-observables, i.e. hidden variables, but also a stipulated number of observables, i.e. measurable variables. At a starting point 40 for the method, the values of the observables and non-observables of the internal state vector are assigned starting values, which form a bias vector $s_0$. The starting values of the bias vector $s_0$ may be ascertained as part of the training of the first neural network. In the example shown, the internal state vector $s_{t-3}$ is formed from the bias vector $s_0$ at the time t−3, said internal state vector comprising the starting values for the observables and non-observables and being stored in a storage unit 26. The index t−3 indicates the time for the computation step.

Moreover, a first data input 21 is used at the time t−3 to read in real state information, which influences the switching times of a signal group of a signal installation, in the form of an external state vector $y_{t-3}^d$ having multiple external state values. The external state values are for example current signal group states, system states, detector values and public transport telegrams. The external state values are supplied, with a negative arithmetic sign, to a first processing unit 22. Moreover, a highest first stipulated number n of observables of the internal state vector $s_{t-3}$ is likewise supplied to the first processing unit 22. The first stipulated number n corresponds to the number of external state values of the external state vector $y_{t-3}^d$.

The first processing unit 22 ascertains in each case the difference between the real state information of the external state vector $y_{t-3}^d$ and the values of the observables of the internal state vector $s_{t-3}$ that correspond to and estimate the external state values. The internal state vector has an observable for every external state value. The differences between each (measured or real) external state value of the external state vector $y_{t-3}^d$ and the value of the corresponding observables of the internal state vector $s_{t-3}$ at the time t−3 are supplied to a third processing unit 23 as a first error vector with a negative characteristic. Further processing steps may also take place here, these being explained later on; that is to say that the first error vector is then initially also processed further before being supplied to the third processing unit 23. Moreover, the internal state vector $s_{t-3}$ is conveyed to the third processing unit 23.

The third processing unit 23 uses an activation function, which in this example is in the form of a hyperbolic tangent function (tan h), and performs the following computation:

$$\tanh\left(s_{t-3} + \begin{bmatrix} -Id \\ 0 \end{bmatrix} \cdot ([Id, 0]s_{t-3} - y_{t-3}^d)\right)$$

$$\begin{bmatrix} -Id \\ 0 \end{bmatrix}$$

denotes a diagonal negative identity matrix, the dimension of which is equal to the dimension of the number of components of the respective vector by which the matrix is multiplied. The first n diagonal elements of the matrix have the value −1. All other values of the matrix have the value 0.

[Id, 0] denotes a diagonal positive identity matrix, the dimension of which is equal to the dimension of the number of components of the respective vector by which the matrix is multiplied. The first n diagonal elements of the matrix have the value +1. All other values of the matrix have the value 0.

The result of the third processing unit 23 is written to the storage unit 26 as a chronologically subsequent internal state vector $s_{t-2}$, which is computed using the following formula, which includes a matrix A:

$$s_{t-2} = A \cdot \tanh\left(s_{t-3} + \begin{bmatrix} -Id \\ 0 \end{bmatrix} \cdot ([Id, 0]s_{t-3} - y_{t-3}^d)\right)$$

Instead of the function tan h, the third processing unit 23 may also use a different activation function, in particular a sigmoid function.

The matrix A is a two-dimensional matrix that comprises weighting factors as elements. It is created using optimized weighting factors during the training of the first neural network.

The interaction of the cited elements of FIG. 4 is explained more precisely below.

The external state vector $y_{t-3}^d$ comprises at least one external state value, in particular multiple external state values, for example from different detectors and control units. The subscript index t−3 indicates the time for which the external state values were ascertained. The external state vector $y_{t-3}^d$ may comprise e.g. the following external state values:

$y_{t-3}^d$=(Signal group states, system states, detector values, public transport telegrams)

The internal state vector $s_{t-3}$ comprises the following predicted data, for example, as observables and non-observables:

$s_{t-3}$=(signal group states, system states, detector values, public transport telegrams, first non-observable, second non-observable, . . . , m-th non-observable)

The internal state vector $s_{t-3}$ therefore comprises the external state values predicted by the neural network at a first stipulated number of n positions.

The first processing unit 22 uses the first n observables of the internal state vector $s_{t-3}$, the number of which is equal to the number of external state values of the external state vector $y_{t-3}^d$, and ascertains a difference between the observables and the external state value for each position. This forms an error vector for the state values, which may be described as follows:

$$([Id, 0]s_{t-3} - y_{t-3}^d)$$

The output of the first processing unit 22 is connected to a fourth processing unit 27. The first processing unit 22 performs vector subtraction, the first n observables of the internal state vector $s_{t-3}$ being added to the negative values of the n components of the external state vector $y_{t-3}^d$. The result is forwarded to the fourth processing unit 27.

Moreover, an input 28 is used to supply a masking vector mask $$y_{t-3}$$

that includes information concerning which of the (measured) external state values of the external state vector $y_{t-3}^d$ are correct and which external state values are erroneous or missing. The masking vector mask $$y_{t-3}$$

may be created e.g. by a local or external computing unit that monitors the incoming signals containing the real state information and checks and verifies the external state values included therein using stipulated methods.

The masking vector mask $$y_{t-3}$$

includes the value 1 for the external state values that were measured and the value 0 for the external state values that were not measured or that are erroneous at the applicable position of the masking vector mask $$y_{t-3}.$$

The fourth processing unit 27 performs vector multiplication using the error vector that is output by the first processing unit 22 and the masking vector. Consequently, this vector multiplication in the fourth processing unit 27 involves the applicable correction values delivered by the first processing unit 22 being set to the value 0 and hence not being used, i.e. being blanked out, for the further computation. If correct sensor data are available, each of the applicable places in the masking vector stores the value 1. Consequently, the vector multiplication in the fourth processing unit 27 then involves the applicable correction values delivered by the first processing unit 22 being multiplied by the value 1 and thus being used for the further computation and being forwarded to the third processing unit 23.

The result of the vector multiplication is forwarded to the third processing unit as an error vector with a negative arithmetic sign.

The third processing unit 23 uses the matrix A to perform the following computation:

$$s_{t-2} = A \cdot \tanh\left(s_{t-3} + \begin{bmatrix} -Id \\ 0 \end{bmatrix} \cdot (mask_{t-3}^y \odot ([Id, 0]s_{t-3} - y_{t-3}^d))\right)$$

This computation is repeated for the times t−2, t−1 and t that follow. The measured external state vectors $$y_{t-2}^d, y_{t-1}^d, y_t^d$$

are supplied to the first neural network via the first data input 21 at each of the times t−2, t−1 and t and are processed using the method described. Erroneous or unavailable external state values of the external state vector $y_t^d$ may easily be blanked out. This is accomplished using the masking vector $mask_t^y$. The subscript index indicates the time for the computation. The index y indicates that the masking vector for the external state vector $y_t^d$ is involved.

Figure 5:
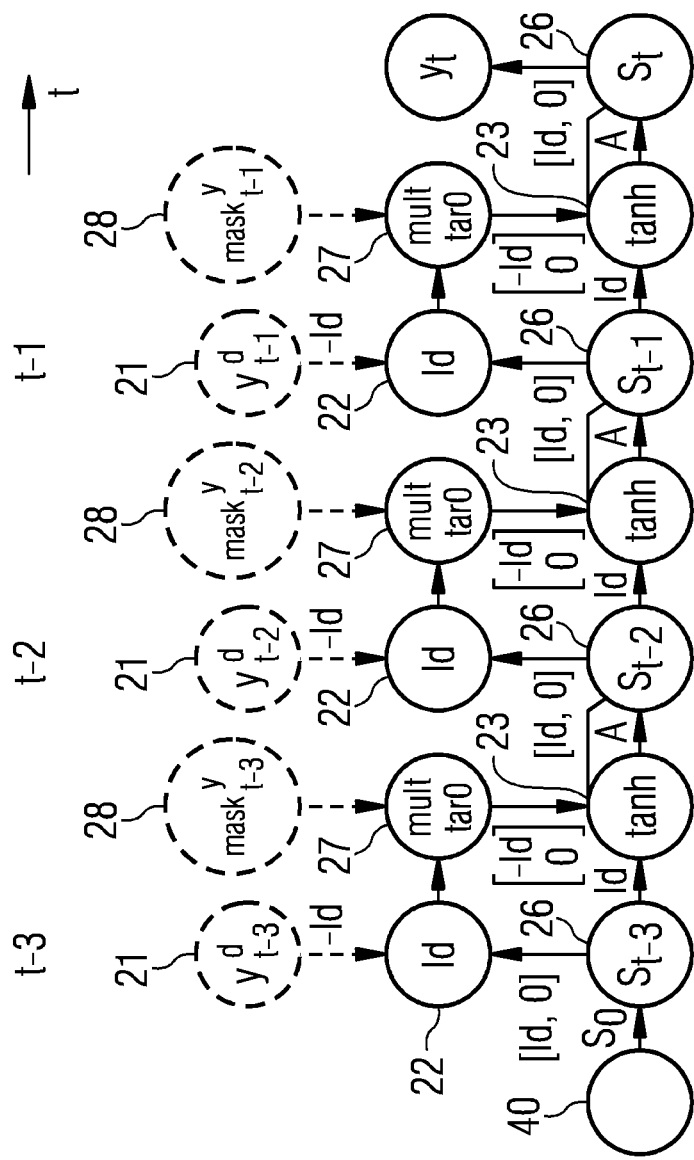
FIG. 5 shows an output of estimated state information by the first neural network.

FIG. 5 shows the case in which an error vector is not ascertained for the current time t in light of an external state vector, since the external state values for the current time t are not received on time. Instead, an estimated state vector $y_t$ that estimates the external state values is output.

The internal state vector $s_t$ for the current time is computed using the following formula:

$$s_t = A \cdot \tan h(s_{t-1})$$

In this case, the first n observables of the internal state vector $s_t$ are output for the current time t as estimated state values, which form the estimated state vector $y_t$.

The estimated state vector $y_t$ ascertained by the computer at the current time t comprises the following state values, for example:

$y_t$=(signal group states, system states, detector values, public transport telegrams)

Experiments have shown that good results are achieved with an internal state vector $s_t$ that comprises a number of approximately 50 non-observables in total. Depending on the chosen embodiment, more or fewer non-observables may also be used. The more non-observables are used, the larger the matrix A and the more complex the training of the first neural network.

The first neural network is trained using known training methods such as for example backpropagation, wherein the state values estimated for the current time t by the first neural network, or the estimated state vector $y_t$, are compared with the (actually occurring and measured) external state values, or the external state vector $y_t^d$. The weighting factors of the matrix A are optimized until the first neural network ascertains the state values, or state vectors, as accurately as possible based on the measured external state values for the current time t.

As already explained, e.g. up to 288 or up to 432 computation steps from the past may be computed using the first neural network. By way of example, the computation steps may each be performed for times at a fixed clock rate that are each at an interval of time of one second.

In a further exemplary embodiment, which resorts to the network architectures explained in the context of FIGS. 3 and 4, the first neural network shown in FIG. 4 is coupled to the second neural network shown in FIG. 3.

In this regard, proceeding from the first neural network in FIG. 4, the internal state vector $s_t$ for the current time t is taken from the storage unit 26, multiplied by the diagonal positive identity matrix [Id,0] and subsequently supplied as an external parameter vector $u_t$ to the second neural network shown in FIG. 3. Any backward gradient flow from the second neural network to the first neural network is prevented.

Furthermore, it should be noted in this context that the matrix A of the first neural network in FIG. 4 and the matrix A of the second neural network in FIG. 3 are different matrices. The second neural network may also have a different architecture than shown in FIG. 3. Different network architectures that are possible have already been mentioned previously; by way of example, the second neural network could also be a feedforward network.

The combination of the first neural network and the second neural network may also be understood in each case as an extension of the previous exemplary embodiments.

Alternatively, the combination of the first neural network and the second neural network may also be regarded as a superordinate third neural network having a heterogeneous architecture.

Figure 6:
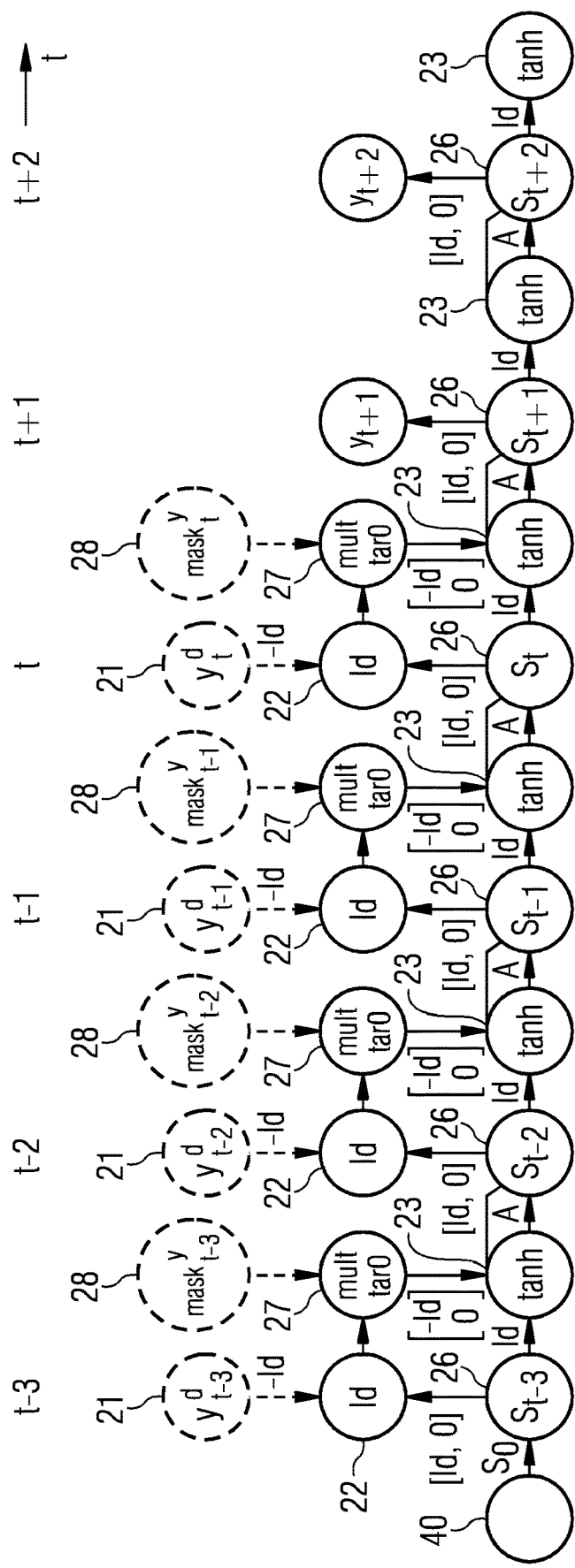
FIG. 6 shows a schematic representation of an embodiment of a third neural network.

FIG. 6 shows another exemplary embodiment of a third neural network that combines the functions of the first neural network from FIG. 4 or FIG. 5 and the second neural network from FIG. 3 and therefore replaces said neural networks.

The explanations relating to FIG. 4 apply to the exemplary embodiment shown in FIG. 6 fully, since these parts of the architecture of the third neural network are consistent with the architecture of the first neural network. Instead of merely outputting an estimated state vector $y_t$ that estimates the external state values for the current time, and that is used by a separate artificial intelligence to predict switching times of a signal group of a signal installation, as shown in FIG. 5, the third neural network shown in FIG. 6 makes this prediction itself. Respective times t−3, t−2, t−1, t, t+1, t+2 are shown for the computation steps of the third neural network.

The third neural network also ascertains both a state vector $s_{t+1}$, $s_{t+2}$, . . . and estimated state vectors $y_{t+1}$, $y_{t+2}$, . . . for future times t+1, t+2, . . . . The representation chosen in FIG. 6 for the number of computation times t is shown only schematically, since in real cases the times at which computations are performed may extend from a time of t−288 to a time of t+144, for example.

After the computations up to the time t+1 are performed as already explained in the context of FIG. 4, the computations of the third processing unit 23 are also performed for future times t+1, t+2, . . . . For the future times t+1, t+2, . . . , however, no further error vectors are ascertained in light of external state vectors $y_t^d$, since these real measurements are not yet available.

Instead, estimated state vectors $y_{t+1}$, $y_{t+2}$, . . . are output for the future times t+1, t+2, . . . , which estimate the external state values at these times.

The internal state vector $s_{t+1}$ for the time t+1 is also computed as described in the context of FIG. 4:

$$s_{t+1} = A \cdot \tanh\left(s_t + \begin{bmatrix} -Id \\ 0 \end{bmatrix} \cdot (mask_t^y \odot ([Id, 0]s_t - y_t^d))\right)$$

In this case, the first n observables of the internal state vector $s_t$ are output for the time t+1 as estimated state values, which form the estimated state vector $y_{t+1}$.

From the time t+2 onward, on the other hand, the internal state vector is computed using the following formula:

$$s_{t+2} = A \cdot \tan h(s_{t+1})$$

In this case, the first n observables of the internal state vectors $s_{t+1}, s_{t+2}, \ldots$ are also output for the time t+2 and all subsequent times as estimated state values, which form the estimated state vectors $y_{t+2}, y_{t+3}, \ldots$.

The estimated state vectors $y_{t+1}, y_{t+2}, \ldots$ ascertained by the third neural network from the times t+1, t+2, ... onward comprise the following state values, for example:

$y_{t+1}$=(signal group states, system states, detector values, public transport telegrams)

The information required for predicting the switching times of the signal groups of the signal installation is therefore available directly in the estimated state vectors $y_{t+1}, y_{t+2}, \ldots$ as signal group states for the future times t+1, t+2, .... By way of example, the signal group states are computed as part of the estimated state vectors $y_{t+1}, y_{t+2}, \ldots$ at intervals of one second up to a time t+120. In this scenario, the third neural network thus predicts the signal group states of the signal installation for the next 120 seconds. The switching times are therefore also implicitly available, since these are directly apparent from any change in the predicted signal group states. Furthermore, it is also possible for the predicted switching times to be able to be taken directly from other components of the estimated state vector $y_t$, for example the system states.

Experiments have shown that good results are achieved with an internal state vector $s_t$ that comprises a number of approximately 50 non-observables in total. Depending on the chosen embodiment, more or fewer non-observables may also be used. The more non-observables are used, the larger the matrix A and the more complex the training of the third neural network.

The third neural network is trained using known training methods such as for example backpropagation, as already explained for the first neural network shown in FIG. 4 and FIG. 5.

By way of example, up to 288 computation steps from the past and up to 144 computation steps in the future may be computed using the third neural network. By way of example, the computation steps may each be performed for times that are each at an interval of time of one hour.

FIG. 7 shows a schematic representation of a program sequence for a method for predicting switching times of a signal group of a signal installation.

In a first program step 100, real state information in the form of external state values is recorded over a predefined period by using sensors, inter alia. The external state values may include signal group states, system states, detector values and public transport telegrams, for example. They are supplied to inputs of the first neural network described above.

In a second program step 110, the first neural network estimates state information for a current time.

It is assumed that the first neural network has already been appropriately trained at this time, which means that the weighting factors of the matrix A have already been optimized for the present system, as a result of which a forecast model for estimating the state information for the current time is already available.

In a third program step 120, a check is performed to determine whether the real state information for the current time has been received on time, completely and correctly. By way of example, the sensors accomplish this by providing information concerning which of the external state values conveyed are missing or defective. Furthermore, a computing unit may use plausibility checks, for example, to check whether the external state values delivered by the sensors are defective. If the values from the sensors are missing, the computing unit detects that the sensor data are missing. By way of example, the real state information is represented by an external state vector. An individual check is now performed for all components of the external state vector, that is to say for each external state value, to determine whether said state value has arrived on time and correctly for the current time at the fixed clock rate. This information is needed for the next program step.

In a fourth program step 130, the real state information and/or the estimated state information for the current time is transmitted to the second neural network described above. The estimated state information replaces all or parts of the real state information if it/they has/have not been received on time or has/have been received erroneously. By way of example, the components of the external state vector that have not arrived on time and correctly for the current time at the fixed clock rate are replaced by the applicable components of the estimated state information.

In a fifth program step 140, a computing unit uses a software and/or hardware structure to execute the second neural network described above and to predict the switching times.

It is assumed that the second neural network has already been appropriately trained at this time, which means that the weighting factors of the matrix A have already been optimized, as a result of which a forecast model for predicting the switching times is already available.

The program subsequently branches to a sixth program step 150, which involves testing whether a stipulated minimum number of computations was performed in the past using the first neural network and the second neural network. If this is not the case, the program branches back to the first program step 100 and further measurements and computations are performed.

By way of example, the number of computations in the past may have been stipulated for a period of several minutes or hours. Moreover, computations may typically be performed for every second.

If the result of the test in the sixth program step 150 is that computations using the first neural network and the second neural network were performed over the stipulated past period, the program branches to a seventh program step 160.

In the seventh program step 160, the prediction by the second neural network is output.

The prediction of the switching times is conveyed to vehicles in the surroundings, for example, in an eighth program step 170. The vehicles may then use this information for example to output adapted driving assistance recommendations relating to speed of travel to a driver or to adapt route planning as appropriate.

Alternatively, the predictions may also be used directly, as a result of which the test in the sixth program step 150 is omitted. Furthermore, the test in the sixth program step 150 may relate just to the first neural network, just to the second neural network or to both neural networks.

The explanations above relating to the first neural network and the second neural network apply in similar fashion to the third neural network, which combines the functions of the first neural network and the second neural network. The basic idea here is that the third neural network is initially supplied with real state information for a period of 120 seconds, for example, before the predictions by the third neural network start to be used.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for predicting switching times of a signal group of a signal installation for controlling a flow of traffic, wherein
real state information, which influences the switching times of the signal group, is received at a fixed clock rate, and
a computing unit predicts at least one switching time of the signal group at the fixed clock rate by using artificial intelligence to which the real state information is supplied,
wherein
the real state information is supplied to a first neural network as input signals,
the first neural network computes estimated state information as a replacement for real state information or parts of the real state information that is/are not received on time or is/are received erroneously for a current time at the fixed clock rate, and
the first neural network outputs the estimated state information for the current time to the artificial intelligence at the fixed clock rate, the estimated state information replacing the real state information or the parts of the real state information that was/were not received on time or was/were received erroneously,
or wherein
the artificial intelligence is a third neural network to which the real state information or estimated state information is supplied as input signals,
the third neural network computes estimated state information as a replacement for real state information or parts of the real state information that is/are not received on time or is/are received erroneously for a current time at the fixed clock rate, and
the third neural network uses the estimated state information for the current time at the fixed clock rate in order to predict the at least one switching time of the signal group, the estimated state information replacing the real state information or the parts of the real state information that was/were not received on time or was/were received erroneously,
wherein the first neural network or the third neural network estimates state information for a current time, wherein it is then checked whether the current state information for the current time was received on time, completely and correctly, and wherein the real state information ( . . . y<d>t−3, y<d>t−2, y<d>t−1, y<d>t) is then replaced with the estimated state information if the real state information was not received on time or was received erroneously.

2. The method as claimed in claim 1, wherein the real state information includes:
signal group states,
system states,
detector values, and/or
messages from vehicles.

3. The method as claimed in claim 1,
wherein the first neural network or the third neural network is a historically consistent neural network that continually computes the estimated state information for the current time at the fixed clock rate.

4. The method as claimed in claim 3,
wherein, if the real state information for the current time is received on time at the fixed clock rate,
the first neural network determines an inconsistency between the real state information and the estimated state information for the current time and uses the inconsistency for error correction, and
the artificial intelligence is supplied with the real state information for the current time at the fixed clock rate.

5. The method as claimed in claim 3,
wherein past real state information for a past time is received too late, and
wherein the first neural network or the third neural network determines an inconsistency between the past real state information and past estimated state information and uses the inconsistency for error correction.

6. The method as claimed in claim 1,
wherein the first neural network and/or the artificial intelligence, or the third neural network, are executed in an external computing unit.

7. The method as claimed in claim 1,
wherein the first neural network or the third neural network is trained with real state information beforehand in such a way that it learns the estimate of the state information for the current time.

8. The method as claimed in claim 7,
wherein at least part of the training of the first neural network or of the third neural network is carried out in an external computing unit, and
wherein after the conclusion of the training the trained first neural network or the trained third neural network is provided to a computing unit of the signal installation.

9. The method as claimed in claim 7,
wherein the first neural network or the third neural network is trained at predefined intervals of time during the operation of the signal installation and the prediction of the switching times, and then the newly trained first neural network or the newly trained third neural network is used.

10. The method as claimed in claim 1,
wherein the first neural network or the third neural network processes at least one piece of state information containing further non-observables in an internal state vector.

11. A computer-readable data carrier,
comprising a non-transitory computer readable hardware storage device having computer readable program code stored therein, said program code executable by a processor of a computer system to implement the method as claimed in claim 1.

12. A computer program product,
comprising a non-transitory computer readable storage medium having instructions which when executed in a processor perform the method as claimed in claim 1.

13. An arrangement for predicting switching times of a signal group of a signal installation for controlling a flow of traffic, comprising:
an interface, configured to receive real state information, which influences the switching times of the signal group, at a fixed clock rate, and a computing unit, configured to predict at least one switching time of the signal group at the fixed clock rate by using artificial intelligence to which the real state information is supplied, wherein the arrangement further comprises a first neural network to which the real state information is supplied as input signals, wherein the first neural network is configured to compute estimated state information as a replacement for real state information or parts of the real state information that is/are not received on time or is/are received erroneously for a current time at the fixed clock rate, and wherein the arrangement is configured to output the estimated state information for the current time to the artificial intelligence at the fixed clock rate, the estimated state information replacing the real state information or the parts of the real state information that was/were not received on time or was/were received erroneously, or wherein the arrangement further comprises a third neural network, which influences the artificial intelligence and to which the real state information is supplied as input signals, wherein the third neural network is configured to compute estimated state information as a replacement for real state information or parts of the real state information that is/are not received on time or is/are received erroneously for a current time at the fixed clock rate, and wherein the third neural network is configured to use the estimated state information for the current time at the fixed clock rate in order to predict the at least one switching time of the signal group, the estimated state information replacing the real state information or the parts of the real state information that was/were not received on time or was/were received erroneously, wherein the first neural network or the third neural network is configured to estimate state information for a current time, wherein the arrangement is configured to then check whether the current state information for the current time was received on time, completely and correctly, and wherein the arrangement is configured to then replace the real state information ( . . . $y{<}d{>}t{-}3$, $y{<}d{>}t{-}2$, $y{<}d{>}t{-}1$, $y{<}d{>}t$) with the estimated state information if the real state information was not received on time or was received erroneously.

* * * * *